(12) United States Patent
Bader et al.

(10) Patent No.: US 11,072,360 B2
(45) Date of Patent: Jul. 27, 2021

(54) GEAR RACK AND METHOD FOR PRODUCING A GEAR RACK FOR A STEERING GEAR OF A MOTOR VEHICLE

(71) Applicants: THYSSENKRUPP PRESTA AG, Eschen (LI); thyssenkrupp AG, Essen (DE)

(72) Inventors: Reinhard Bader, Satteins (AT); Ralf Eckstein, Mauren (LI); Roland Musweiler, Düsseldorf (DE)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 369 days.

(21) Appl. No.: 16/315,858

(22) PCT Filed: Jul. 4, 2017

(86) PCT No.: PCT/EP2017/066621
§ 371 (c)(1),
(2) Date: Jan. 7, 2019

(87) PCT Pub. No.: WO2018/007376
PCT Pub. Date: Jan. 11, 2018

(65) Prior Publication Data
US 2019/0300045 A1  Oct. 3, 2019

(30) Foreign Application Priority Data
Jul. 6, 2016 (DE) ..................... 10 2016 212 308.4

(51) Int. Cl.
*B62D 3/12* (2006.01)
*B21K 1/76* (2006.01)

(52) U.S. Cl.
CPC .............. *B62D 3/126* (2013.01); *B21K 1/767* (2013.01)

(58) Field of Classification Search
CPC ...... B62D 3/126; B21K 1/767; Y10T 74/1967
See application file for complete search history.

(56) References Cited

U.S. PATENT DOCUMENTS 3,337,108 A    8/1967 Taylor
3,472,996 A   10/1969 Braid
(Continued)

FOREIGN PATENT DOCUMENTS

CN      2 508 888 Y      9/2002
CN      1845844 A       10/2006
(Continued)

OTHER PUBLICATIONS

DE-102011000741-A1 machine translation (Year: 2012).*
(Continued)

*Primary Examiner* — Jacob J Cigna
*Assistant Examiner* — Michael W Hotchkiss
(74) *Attorney, Agent, or Firm* — thyssenkrupp North America, LLC

(57) ABSTRACT

A method can be employed to produce a rack for a steering gear. The rack may include a toothed portion with a toothing, and a shaft portion with a functional portion. Separate segments comprising at least one in each case bar-shaped toothed segment and one shaft segment may be provided, which are aligned on a common longitudinal axis and are connected to one another at a joint. The method may involve providing a shaft raw material piece having a length that is a multiple of a shaft segment length, continuously grinding a part of a circumferential face of the shaft raw material piece across a multiple of the shaft segment length to produce a semi-finished shaft segment product, cutting to length a shaft segment from the semi-finished shaft segment product, providing a toothed segment, and joining the shaft segment to the toothed segment.

18 Claims, 8 Drawing Sheets

(56) References Cited

U.S. PATENT DOCUMENTS

| | | | |
|---|---|---|---|
| 3,609,854 A | 10/1971 | Hasui | |
| 4,193,722 A | 3/1980 | Bishop | |
| 5,473,960 A | 12/1995 | Sakamoto | |
| 5,858,142 A | 1/1999 | Tully | |
| 6,706,127 B1* | 3/2004 | Duggirala | B23P 15/00 148/570 |
| 6,925,899 B2 | 8/2005 | Ozeki | B21K 1/767 74/109 |
| 7,225,541 B2 | 6/2007 | Kubota | |
| 7,654,165 B2* | 2/2010 | Roeske | B62D 3/126 74/388 PS |
| 8,104,369 B2 | 1/2012 | Yamawaki | |
| 9,139,221 B2* | 9/2015 | Takai | B62D 5/0442 |
| 9,149,860 B2* | 10/2015 | Dohmann | B21J 13/02 |
| 9,694,843 B2* | 7/2017 | Taoka | B62D 3/126 |
| 10,562,138 B2* | 2/2020 | Nomura | B23P 15/14 |
| 10,612,642 B2* | 4/2020 | Yamawaki | B23K 20/1205 |
| 2003/0097894 A1 | 5/2003 | Ozeki | |
| 2004/0104067 A1 | 6/2004 | Fishbach | |
| 2004/0256439 A1 | 12/2004 | Pfeiler | |
| 2005/0115298 A1 | 6/2005 | Brenner | |
| 2005/0255927 A1* | 11/2005 | Michioka | F16F 7/01 464/181 |
| 2006/0016238 A1 | 1/2006 | Shiokawa | |
| 2007/0051776 A1 | 3/2007 | Estes | |
| 2007/0057479 A1 | 3/2007 | Wolf | |
| 2007/0137343 A1 | 6/2007 | Roeske | |
| 2007/0204668 A1 | 9/2007 | Shiokawa | |
| 2008/0127762 A1* | 6/2008 | Baxter | F16H 55/26 74/422 |
| 2009/0200356 A1 | 8/2009 | Kawaura | |
| 2009/0242613 A1 | 10/2009 | Kawaura | |
| 2009/0260467 A1 | 10/2009 | Kobayashi | |
| 2010/0038167 A1 | 2/2010 | Bilmayer | |
| 2010/0052280 A1* | 3/2010 | Bilmayer | B62D 3/126 280/93.514 |
| 2010/0162843 A1* | 7/2010 | Kobayashi | F16H 55/26 74/422 |
| 2010/0206861 A1* | 8/2010 | Rudolph | B23K 20/12 219/137 R |
| 2012/0186085 A1 | 7/2012 | Kobayashi | |
| 2012/0258329 A1 | 10/2012 | Tanabe | |
| 2014/0060956 A1* | 3/2014 | Takai | F16H 55/26 180/444 |
| 2015/0239872 A1 | 8/2015 | Mc Gowan | |
| 2015/0276037 A1* | 10/2015 | Yamawaki | F16H 55/26 74/640 |
| 2015/0298721 A1* | 10/2015 | Suzuki | B62D 65/00 74/457 |
| 2017/0203781 A1* | 7/2017 | Kato | B62D 5/0421 |
| 2018/0031104 A1* | 2/2018 | Yamawaki | B24B 5/22 |
| 2018/0221938 A1* | 8/2018 | Mizutani | B21K 1/76 |
| 2018/0304422 A1* | 10/2018 | Nomura | B62D 3/126 |
| 2018/0306303 A1* | 10/2018 | Inagaki | F16H 55/06 |
| 2020/0009643 A1* | 1/2020 | Goto | B21K 1/768 |
| 2020/0056693 A1* | 2/2020 | Yamawaki | B62D 3/126 |

FOREIGN PATENT DOCUMENTS

| | | | |
|---|---|---|---|
| CN | 1856377 A | 11/2006 | |
| CN | 101549436 A | 10/2009 | |
| DE | 28 16 222 A | 10/1979 | |
| DE | 103 45 042 B | 12/2004 | |
| DE | 10330188 A | 2/2005 | |
| DE | 10 2004 049 365 A | 4/2006 | |
| DE | 10 2005 010 814 B | 7/2006 | |
| DE | 10 2007 018 919 A | 10/2008 | |
| DE | 10 2010 036 609 A | 1/2012 | |
| DE | 10 2010 055 165 A | 6/2012 | |
| DE | 102011000741 A1 * | 8/2012 | F16H 55/26 |
| DE | 10 2012 011 509 A | 12/2013 | |
| DE | 102012011509 A1 * | 12/2013 | B62D 3/126 |
| DE | 10 2013 007 072 A | 3/2014 | |
| EP | 0 686 455 A | 12/1995 | |
| EP | 1 316 492 A | 6/2003 | |
| EP | 1469959 B | 10/2004 | |
| EP | 1946865 A | 7/2008 | |
| EP | 2 937 265 A | 10/2015 | |
| JP | S59104237 A | 6/1984 | |
| JP | 2006-46423 A | 2/2006 | |
| JP | 2006046423 A * | 2/2006 | |
| WO | 2005/053875 A | 6/2005 | |
| WO | 2006/066309 A | 6/2006 | |
| WO | 2006/094479 A | 9/2006 | |
| WO | 2008138033 A | 11/2008 | |
| WO | 2009/052552 A | 4/2009 | |
| WO | 2012/110307 A | 8/2012 | |
| WO | 2014037579 A | 3/2014 | |
| WO | 2014/104410 A | 7/2014 | |
| WO | 2014196617 A | 12/2014 | |

OTHER PUBLICATIONS

JP-2006046423-A machine translation (Year: 2007).*
DE-102012011509-A1 machine translation (Year: 2013).*
Din En 10083-1, Steels for quenching and tempering—Part 1: General technical delivery conditions, pp. 1-27, Oct. 2006.
Din En 10083-2, Steels for quenching and tempering—Part 2: Technical delivery conditions for non alloy steels, pp. 1-39, Oct. 2006.
Din En 10083-3, Steels for quenching and tempering—Part 3: Technical delivery conditions for alloy steels, pp. 1-58, Jan. 2007.
English Translation of International Search Report issued in PCT/EP2017/066621, dated Oct. 16, 2017.
Din En 10083.

* cited by examiner

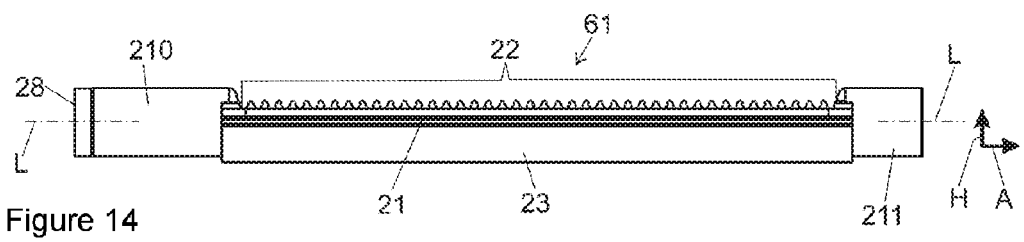
Figure 14
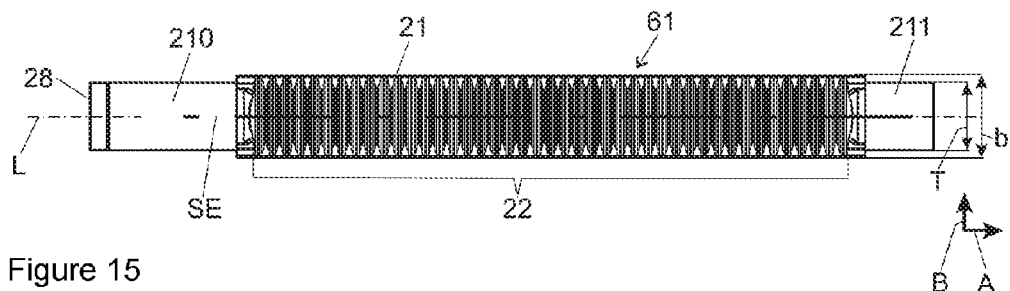
Figure 15
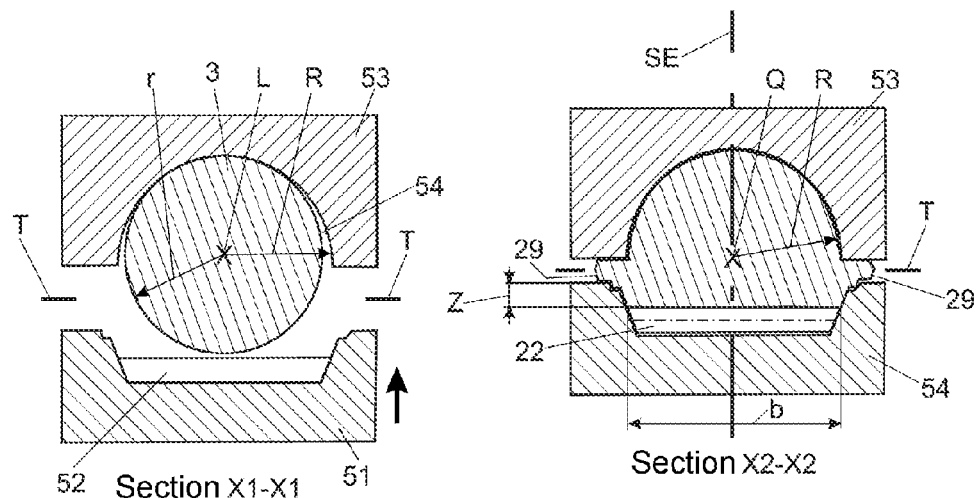
Figure 16 — Section X1-X1
Figure 17 — Section X2-X2
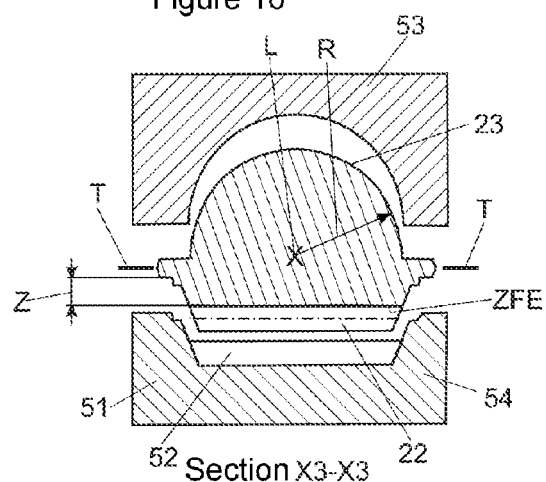
Figure 18 — Section X3-X3
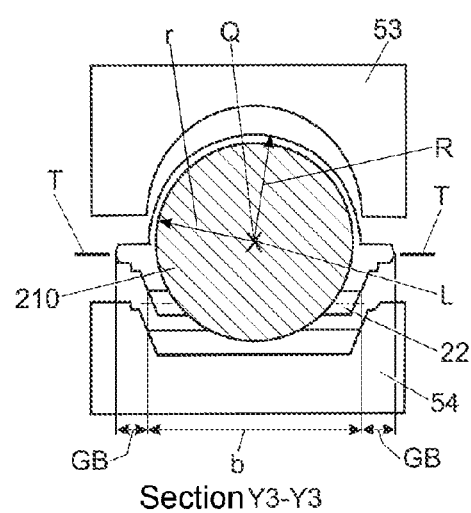
Figure 19 — Section Y3-Y3

Section C-C

Section D-D

GEAR RACK AND METHOD FOR PRODUCING A GEAR RACK FOR A STEERING GEAR OF A MOTOR VEHICLE

CROSS REFERENCE TO RELATED APPLICATIONS

This application is a U.S. National Stage Entry of International Patent Application Serial Number PCT/EP2017/066621, filed Jul. 4, 2017, which claims priority to German Patent Application No. DE 10 2016 212 308.4, filed Jul. 6, 2016, the entire contents of both of which are incorporated herein by reference.

FIELD

The present disclosure generally relates to steering mechanisms for motor vehicles, including methods for producing racks for steering gears of motor vehicles.

BACKGROUND

In a vehicle steering mechanism a steering command as a rotating movement is introduced by way of the steering wheel into the steering shaft, a pinion which meshes with a toothing of a rack in a steering gear being attached to said steering shaft. The rack is mounted in the steering gear so as to be displaceable in the axial direction, that is to say in the direction of the longitudinal axis of said rack, such that a rotation of the pinion is converted to a translatory movement of the rack in the axial longitudinal direction of the latter. Tie rods which are connected to the steering knuckles of the wheels to be steered are fastened to the rack, the translatory movement of the rack being converted to a steering movement at said wheels.

The rack has at least one toothed portion in which the toothing for the engagement of the pinion across a predefined axial length is configured. In the case of a generic rack at least one shaft portion adjoins the toothed region in the direction of the longitudinal axis, said shaft portion being configured in a manner similar to the toothed portion so as to be bar-shaped in the longitudinal direction, preferably having a cylindrical basic shape and at least one functional portion. A threaded portion or a second toothed portion, for example, can be configured as a functional portion in order for a power assistance unit for steering to be coupled in. Furthermore, a bearing portion which can at least in part be configured so as to be cylindrical can be provided for the translatory mounting in the axial direction. Connection elements for connecting to the tie rods can in each case be attached to the toothed portion and the shaft portion at the free ends that face away from one another in the longitudinal direction.

In order to be able to better adapt the material properties to the stresses that arise in operation and in order to optimize the production for configuring the functional regions it is known in the prior art for the toothed portion to be initially configured on a toothed segment and for the shaft portion to be provided as a shaft segment that is separate from said toothed segment. The initially separate segments in terms of the respective functionality thereof can be designed by way of the choice of material, heat-treatment processes, for example continuous or partial thermal tempering, and process-optimized machining methods such as, for example, cold forming or hot forming, milling, grinding, or the like. The segments, at least the toothed segment and the shaft segment, are subsequently coaxially aligned on a common longitudinal axis and, at their ends that are directed axially toward one another at the end side, the connecting or joining ends, are connected to one another at a joint. This construction mode is therefore also referred to as a constructed rack. The connection of the segments can be carried out by means of connection elements, as described for example in DE 10 2007 018 919 A1, or else by substance-to-substance joining methods, preferably by welding, as described in JP2006 46423 A or DE 10 2013 007 072 A1. Further segments can optionally be connected to the shaft segment and/or the toothed segment.

In the production of a constructed rack the segments, at least the toothed segment and the shaft segment, each pass through a plurality of machining steps. The manufacturing of a shaft segment which is made from a rod-shaped, preferably cylindrical or tubular, shaft raw material and for final machining has to be ground with a high dimensional precision across the axial length of said shaft segment, in particular requires a previously complex and time-intensive production process for each individual shaft segment, by means of the re-clamping and set-up of the grinder.

Thus a need exists for improved racks and manufacturing processes of constructing racks more efficiently, in particular with respect to the provision of shaft segments which that are ground in a dimensionally accurate manner.

BRIEF DESCRIPTION OF THE FIGURES

FIG. 14 is a schematic side view of the finished toothed segment according to FIG. 13 that is transverse to a longitudinal direction, in a direction of a width of a toothing (in a direction of a toothing width).

FIG. 15 is a plan view of the finished toothed segment according to FIG. 13 (in a direction of a height) onto the example toothing, the view being transverse to a longitudinal direction.

FIG. 16 is a cross-sectional view across line X1-X1 through the example die according to FIG. 11.

FIG. 17 is a cross-sectional view across line X2-X2 through the example die according to FIG. 12.

FIG. 18 is a cross-sectional view across line X3-X3 through the example die according to FIG. 13.

FIG. 19 is a cross-sectional view across line Y3-Y3 through the example die according to FIG. 13.

DETAILED DESCRIPTION

Figure 1:
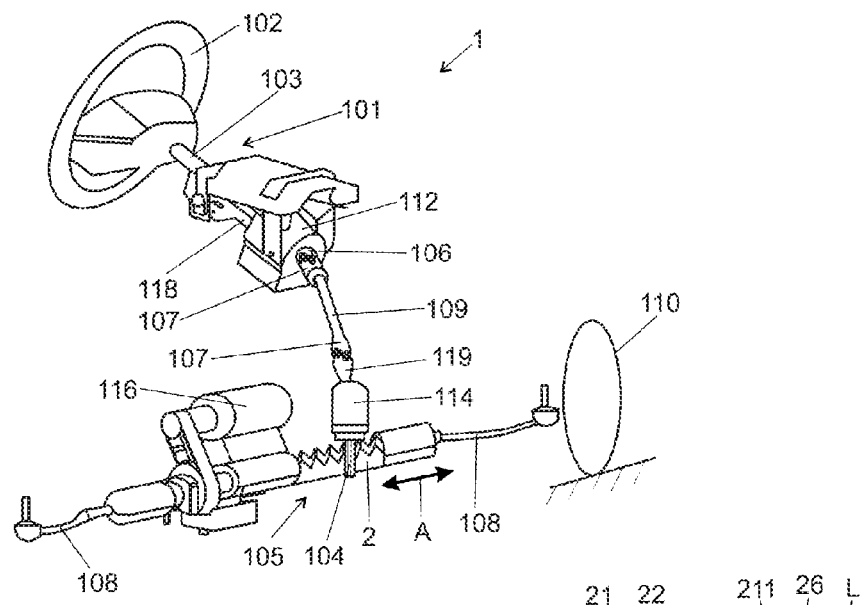
FIG. 1 is a schematic perspective view of an example steering system for a motor vehicle.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to racks for a steering gear of a motor vehicle, as well as methods for producing such racks. In some examples, a rack may include at least one toothed portion having a toothing, and at least one shaft portion having at least one functional portion. Separate segments comprising at least one in each case bar-shaped toothed segment and one shaft segment may be aligned on a common longitudinal axis and may be connected to one another at a joint.

In order for the abovementioned set of issues to be solved, a method comprising the following steps is proposed according to the invention:

providing a shaft raw material piece having a piece length of a multiple of a shaft segment length;

continuous grinding of at least part of the circumferential face of the shaft material piece across a multiple of the shaft segment length in order for a semi-finished shaft segment product to be produced;

cutting to length a shaft segment from the semi-finished shaft segment product;

providing a toothed segment;

joining the shaft segment to the toothed segment.

According to the invention the manufacturing process for the production of a constructed rack is optimized in that the dimensionally accurate fine machining which in the prior art is performed on a tailored-to-length shaft segment blank is at least partially performed already in an upstream method step on the shaft raw material. The shaft raw material herein can be made available in each case as a shaft raw material piece, for example in the form of a long rod of round material or profiled material, or as a hollow profile in the form of a long raw material, preferably of steel. The axial length of the shaft raw material piece is solely determined by the production method of the raw material which typically provides machining processes such as continuous casting, pressing, rolling, peeling, drawing, and the like that are continuous in the longitudinal direction. On account thereof, a shaft raw material piece can in principle have any arbitrary piece length, the latter however, for reasons of logistics and handling, in practice being predefined to typically be in the magnitude of a few meters, for example 2 to 10 meters.

The piece length of a shaft raw material piece of this type is a multiple of the shaft segment length which is defined substantially by the length of the shaft segment measured in the axial longitudinal direction from the joint to the free end, and in practice in most instances lies below one meter, and typically can be between 0.1 and 0.5 meters, for example, depending on the embodiment of the steering gear.

In the prior art, portions corresponding to the shaft segment length are cut to length from the shaft raw material and subjected to fine machining, in particular to circular grinding or profile grinding of the surface to the required final dimension, in order for a functional portion to be generated. The final dimension is defined by the functional mating faces in the steering gear, for example bearing faces, or by downstream production processes, and accordingly has tight tolerances. On account thereof, a high production complexity is created, as has been mentioned.

According to the invention, the fine machining to the final dimension, which is demanded by the construction of the respective steering gear and for which the adherence to tight tolerance limits is required, is already performed on the shaft portion raw material. The method according to the invention to this end provides the machining of at least part of the circumferential face of the shaft raw material piece by means of continuous grinding. This herein is an efficient continuous machining process which enables the profile cross section of the shaft raw material piece across the entire raw material length thereof to be rendered in a dimensionally accurate manner to a required final dimension within the permissible tolerances, said final dimension being predefined by the construction mode of the respective steering gear. In this way, a semi-finished shaft segment product which extends across a multiple of the shaft segment length, or the shaft portion length, respectively, can be made available in a single work step, wherein time-consuming re-clamping and aligning is dispensed with.

One advantage of the method according to the invention is derived from the fact that a semi-finished shaft segment product in which a functional portion of a shaft portion is at least partially configured to the predefined final dimension already on the shaft portion raw material can be made available by continuous grinding, as is required by the function in the steering gear or by downstream production processes. A functional portion of this type can comprise, for example, a bearing face which serves for mounting the rack in the steering gear.

The surfaces machined according to the invention by means of continuous grinding can optionally be further machined in downstream processing steps. For example, one or a plurality of further shape elements, for example teeth of a toothing, grooves, thread turns, form-fitting and/or force-fitting elements, or the like, can be incorporated in a profile that has been ground in a dimensionally accurate manner. The implementation can be performed, for example, by means of milling, grinding, or other suitable shape-imparting production methods.

Shaft segments can be generated in a simple manner by being cut to length from the semi-finished shaft segment product according to the invention. To this end, part-pieces are severed from the semi-finished shaft segment product, said part-pieces having an axial length which corresponds to the shaft segment length, the latter in turn typically corresponding substantially to the required shaft portion length, optionally while adding an additional machining length. The cutting-to-length is preferably performed by sawing or laser cutting. The additional machining length can be required for an optionally required preparation of the joining face, or take into account and compensate for the shortening by way of the joining method used, for example an axial compression in a thermal joining method such as friction welding or the like. On account thereof, the piece length of the shaft raw material piece according to the invention is also always a multiple of the shaft portion length.

In downstream method steps for producing a rack, a toothed segment is provided and, conjointly with the shaft segment that is generated according to the invention by being cut-to-length from the semi-finished shaft segment product, aligned on a common longitudinal axis. This means that the shaft segment axes are aligned so as to be mutually offset in a coaxial or parallel manner. The herein mutually opposite joining faces of the toothed segment and the shaft segment, said joining faces being at the end sides in relation to the longitudinal axis, are subsequently joined to one another by means of a joining method, wherein a joint is configured, wherein the segments after joining have a common longitudinal axis. In principle, joining methods which by way of a form-fit, a force-fit, and/or a materially integral fit, enable a permanent fixed connection are suitable. Welding methods can preferably be used, such as, for example, friction welding, this guaranteeing an efficient production and a reliable connection.

It can be provided that the shaft portion raw material piece is provided as a hot-formed and/or cold-formed and/or subtractively machined material portion. For example, the raw material piece can be provided as a bar that is form-rolled from a solid material, or else as a welded or seamless tube. Prior to continuous grinding, the shaft portion raw material piece can moreover be formed in a subtractive and/or non-subtractive manner by means of suitable methods in order for a specific shape, surface property or material property to be generated, for example by sizing rolling, pressing, drawing, calibrating, peeling, or additional or alternative processing methods, respectively.

It is furthermore conceivable and possible that the shaft portion raw material piece is thermally treated prior to continuous grinding. The raw material can be continuously or partially hardened by a thermal treatment, for example, so as to optionally adapt said raw material to the stresses to be expected when in operation. The continuous grinding according to the invention herein has the advantage that hardened surfaces having a high surface quality and dimensional accuracy can be precision-machined in an economical manner.

A further method step can include that at least one end-side end face of the shaft segment is provided by the cutting-to-length, in order for a joining face to be configured.

A further method step can include that after the cutting-to-length at least one end-side end face of the shaft segment is machined in order for a joining face to be configured. The connection end that is provided for the connection to the toothed element can be prepared for the joining method to be used by corresponding subtractive or plastic machining methods; for example, a surface finish and/or a surface shape that is adapted to a welding method can be produced, or any other adaptation to the corresponding joining face of the toothed element can be performed.

The toothed segment and the shaft segment are preferably welded to one another, preferably by friction welding. In stir friction welding, the segments to be joined to one another are aligned on the common longitudinal axis of said segments, are set in rotation relative to one another about said longitudinal axis, and herein pressed onto one another in the longitudinal direction by way of the end faces of said segments which are directed toward one another and which form or comprise, respectively, the joining faces. The friction heat that is created herein causes the joining faces to melt such that a materially integral welded connection is established.

It is possible for at least one further functional segment to be provided and to be joined to the toothed segment and/or to the shaft segment. A further functional segment can, for example, comprise a connection portion for connecting the toothed portion or the shaft portion to a tie rod, or else an intermediate portion that in the axial direction is inserted between the toothed segment and the shaft segment. The same joining techniques can be used for fastening a functional segment as have been described above for toothed segments and shaft segments. Like these segments, one or a plurality of functional segments can be machined according to the method according to the invention before joining.

Instead of a shaft segment, it is furthermore conceivable and possible in general for other segments, for example toothed segments or functional segments, to be produced according to the method according to the invention. The method steps accordingly are:
- providing a segment raw material piece having a piece length of a multiple of a segment length;
- continuous grinding of at least part of the circumferential face of the segment raw material piece across a multiple of the segment length in order for a semi-finished segment product to be produced;
- cutting to length a segment from the semi-finished segment product;
- providing a further segment;
- joining the segment to the further segment.

The further explanations described above can be applied in an analogous manner from shaft segments to other segments, for example for the efficient production of toothed segments.

The object is likewise achieved by a rack for a steering gear of a motor vehicle, said rack having at least one toothed portion having a toothing, and at least one shaft portion having at least one functional portion, wherein at least one end region of the shaft portion has a ground surface and the toothed portion has a purely formed surface.

The purely formed surface of the toothed portion is to be understood as meaning that the surface of the toothed region of the toothed portion is formed in a purely plastic manner by inherent forming, that is to say by a plastic deformation of the material such as, for example, forging, pressing, kneading, or the like. These herein can be cold-forming or hot-forming methods. The face of the toothed portion that encloses the longitudinal axis is preferably formed exclusively by forming. This however does not preclude that a thread for coupling to a tie rod can be incorporated in the end face of the free end of the toothed portion. Furthermore, a chamfer can be attached to the free end of the toothed portion by mechanical or subtractive processing, respectively.

The shaft portion preferably has a thread, wherein the thread turns have a surface finish that deviates from the ground surface.

The dissimilar surface finish is a result of the thread turns being incorporated in the shaft portion only after the grinding operation. The surface finish can be determined from the Abbott-Firestone curve, also referred to as the bearing area curve, of the respective surface.

The end region of the shaft portion is preferably disposed on the free end of the shaft portion, wherein a chamfer can be disposed between the free end of the shaft portion and the end region. The end region on account of the continuous grounding according to the invention has a precise surface roughness which does not require any further post-machining.

The continuously ground end region preferably has a mean roughness depth Rz having a value of less than or equal to 6.3 µm. The mean roughness depth Rz of the continuously ground end region preferably has a value of less than or equal to 3.2 µm. An accurate and reliable guiding of the rack can be achieved on account of said roughness depths, without said rack over the service life thereof being subjected to any functionally compromising wear.

The same parts are at all times provided with the same reference signs in the various figures, said same parts therefore typically also being identified or mentioned, respectively, in each case only once.

FIG. 1 shows a schematic perspective illustration of a motor vehicle steering mechanism 1, wherein a torque as a steering torque can be introduced by the driver into a steering shaft 101 by way of a steering wheel 102. The steering torque is transmitted by way of the steering shaft 101 to a steering pinion 104 which meshes with a rack 2 which then in turn transmits the predefined steering angle to the steerable wheels 110 of the motor vehicle by way of respective tie rods 108. The steering pinion 104 conjointly with the rack 2 forms a steering gear 105. The steering gear 105 has a housing (not illustrated here) in which the steering pinion 104 is mounted so as to be rotatable and the rack 2 is mounted so as to be longitudinal displaceable in both directions in the longitudinal direction A, also referred to as the axial direction A, this being indicated by the double arrow.

An electric and/or hydraulic power assistance unit in the form of a power assistance unit 112, alternatively also a power assistance unit 114 or 116, respectively, can be coupled either to the steering shaft 1, to the steering pinion 104, or the rack 2, respectively. The respective power assistance unit 112, 114, or 116 introduces an auxiliary torque into the steering shaft 1, the steering pinion 104, and/or an auxiliary force into the rack 2, on account of which the driver is assisted in operating the steering. The three different power assistance units 112, 114, and 116, illustrated in FIG. 1, show alternative positions for the disposal of said power assistance units. Only a single one of the positions shown is usually occupied by a power assistance unit. The auxiliary torque or the auxiliary force for supporting the driver, which is to be applied by means of the respective power assistance unit 112, 114, or 116, is determined while taking into account the input torque detected by a torque sensor 118 which can be disposed in the power assistance unit 112 or 114.

The steering shaft 1 has an input shaft 103 that is connected to the steering wheel 102, and an output shaft 106 that is connected to the steering pinion 104.

The output shaft 106, by way of an articulated joint 107 which is configured as a universal joint or a cardan joint, is connected to a shaft 109 which forms an intermediate shaft of the steering shaft 101 and which, by way of a further articulated joint 107 of identical construction, is connected to an input shaft 119 of the steering gear 105.

Figure 2:
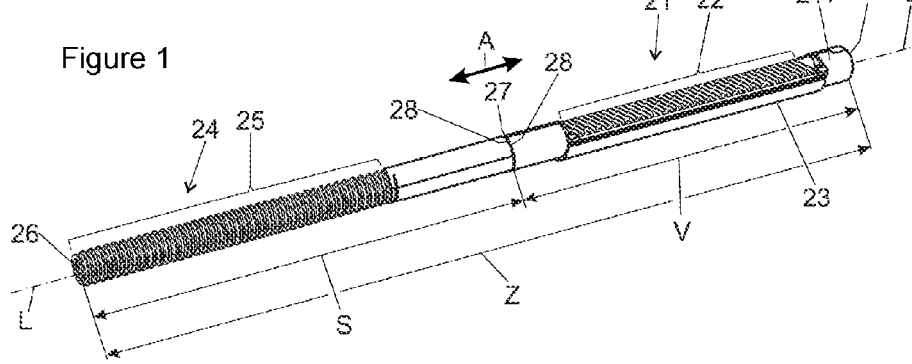
FIG. 2 is a perspective view of an example rack.

The rack 2 of the steering gear 105 is shown on its own in FIG. 2. It can be derived therefore that the rack 2 is configured so as to be bar-shaped and has a cylindrical basic shape which is elongate in the axial direction A and has a longitudinal axis L. The axial direction A in which the rack 2 is mounted so as to be longitudinally displaceable in the steering gear 105 lies so as to be parallel with the longitudinal axis L.

The rack 2 has a toothed portion 21 which on one side is provided with a toothing 22 which extends in the longitudinal direction A. That side that in relation to the longitudinal axis L is diametrically opposite the toothing is configured as a rack back 23 which hereunder is referred to for short as back 23.

The rack 2 furthermore has a shaft portion 24 which in the example shown in FIG. 2 has a thread 25 and is also referred to as the threaded portion 24. A spindle nut (not illustrated) is screw-fitted to the thread 25 in the steering gear 105, said spindle nut by the power assistance unit 116 being drivable so as to rotate about the longitudinal axis L, on account of which a force for supporting the steering can be applied to the rack 2 in the longitudinal direction A.

In order for a ball screw drive in which the spindle nut is configured as a recirculating ball nut to be formed, the thread 25 in terms of the thread profile and of the material properties can be optimized for the balls to roll, for example by hardening the steel from which the shaft portion 24 is made.

The toothed portion 21 and the shaft portion 24 have external free ends 26 which face away from one another in the longitudinal direction and which form the ends of the rack 2 where the tie rods 108 can be connected.

The rack 2 according to the invention is a constructed rack in which the toothed portion 21 having the toothing 22 and the shaft portion 24 having the thread 25, at the ends thereof that face one another in the axial direction by way of the end faces of said toothed portion 21 and of said shaft portion 24, hereunder referred to as joining faces 28, are connected to one another, for example by welding methods such as friction welding, in a joint 27.

The rack 2 in the finished state shown in FIG. 2, when measured along the longitudinal axis L, has a length Z which is composed of the shaft portion length S and of the toothed portion length V, in each case measured from the free end 26 up to the joint 27. The toothed portion 21 and the shaft portion 24 can preferably be made from a solid material.

By virtue of the configuration of the rack 2 from individual segments it is possible for the diameters of the unmachined parts for the shaft portion and the toothed portion to be conceived so as to be different. On account thereof, savings in terms of material can also be achieved without the use of hollow unmachined materials (tubes).

The shaft portion and the toothed portion are advantageously formed from a solid material since the initial product is more cost-effective, the manufacturing is simpler, and the post-machining, including hardening, is associated with fewer risks.

Furthermore, by virtue of the configuration of the rack from individual segments, the toothed portion and the shaft portion can be formed from different materials. For example, the toothed portion is preferably formed from the steel types SAE1040 or 37CrS4 according to DIN EN 10083, and the shaft portion is preferably formed from the heat-treatable steel C45 according to DIN EN 10083.

In order for a constructed rack 2 to be produced, prefabricated segments first have to be provided which subsequently by way of the joining faces 28 thereof are joined together at the joint 27. It will be explained hereunder how the production of a constructed rack 2 by way of the method according to the invention can be performed particularly economically by way of machining the segments according to the invention.

The production of a segment is performed to as to proceed from an unmachined segment material piece 3 which for short is also referred to as the unmachined material piece 3, or with a view to the further intended use is referred to, for example, as the unmachined shaft material piece or the unmachined toothed material piece. An unmachined material piece 3 can be provided as bar material, for example having a round cross section, for example from rolled or extruded steel. The piece length G of the unmachined material piece 3 can in principle be of arbitrary size; piece lengths G in the range from 2 m to 10 m are offered at a diameter in the magnitude from 20 to 40 mm in practice. This is a multiple of the length Z of a rack 2, or of the length S of a shaft portion 24, or of the length V of a toothed portion 21, respectively, said lengths being between approximately 0.1 m and 0.5 m.

Figure 3:
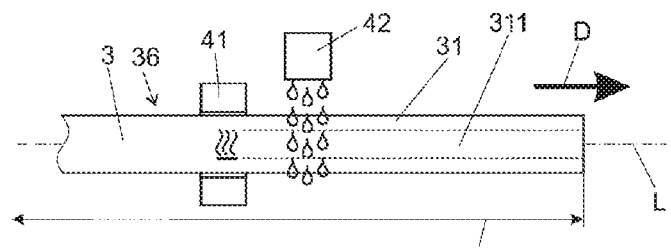
FIG. 3 is a schematic view of an example shaft semi-finished segment product in continuous hardening.

When particular requirements are set for the material hardness, hardened steel is used for producing the shaft portion or the toothed portion. Hardening according to the invention can be performed as is schematically illustrated in FIG. 3. An unmachined material piece 3 from hardenable steel, for example an unmachined shaft material piece, is provided and is aligned on the longitudinal axis L. Said unmachined material piece 3 is moved longitudinally in the processing direction D so as to be parallel with the longitudinal axis L, as is indicated by the arrow in FIG. 3. Said unmachined material piece 3 herein is guided through a continuous heating installation 41, for example through the coil assembly of an induction heating device. Continuous heating is performed in the continuous heating installation 41, wherein the steel is heated beyond the austenitizing temperature thereof. A continuous cooling installation 42 adjoins in the processing direction D, the heated unmachined material piece 3 likewise being moved continuously through said continuous cooling installation 42. Controlled continuous cooling is performed herein by a gaseous and/or liquid cooling fluid, for example, on account of which the steel is hardened, continuous hardening consequently being implemented. The process parameters such as temperatures as well as heating and cooling periods and rates are predefined so as to depend on the steel type used and on the material properties targeted by the hardening. A hardened semi-finished segment product 31 is available after continuous cooling in the continuous cooling installation 42, said hardened semi-finished segment product 31 being able to be fed to further processing steps. The semi-finished segment product after the hardening operation preferably has a cylindrical core region 311 which in relation to the initial material of the unmachined material piece 3 has not been imparted any hardness increase, as is illustrated in the example of FIG. 3.

An advantage of continuous hardening is that a hardened shaft semi-finished segment product 31 is provided, which has substantially the piece length G of the unmachined material piece 3, said piece length G corresponding to a multiple of the length Z of the rack or of the shaft portion length S or of the toothed portion length V, respectively. On account thereof, a more economical manufacturing can be performed than in the prior art, it being commonplace in the latter for the unmachined material prior to hardening to be cut to the length of one segment length Is.

Figure 9:
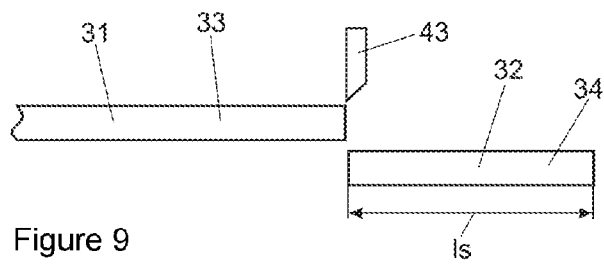
FIG. 9 is a schematic view of an example toothed segment blank being cut to length from a toothed semi-finished segment product according to FIG. 7 or FIG. 8.

By means of a separation installation 43, hardened segments 32 which have a segment length Is can be cut to length in a simple manner from the hardened shaft semi-finished segment product 31 which has the piece length G. This is schematically illustrated in FIG. 9. On account of the piece length G being a multiple of the segment length Is of a hardened segment 32, a correspondingly large number of segments 32 can be generated economically. The hardened segments 32 can be connected to further segments or be used as segment blanks which in further processing steps can be machined according to the intended use of said segments, for example as shaft segments, connection segments, or other functional segments.

In order for a rack 2 to be produced, it can be necessary for a segment having a high dimensional accuracy in the profile to be provided. The grinding of segment blanks which have already been shortened to the segment length Is, as is commonplace in the prior art, is tedious and complex.

Figure 4:
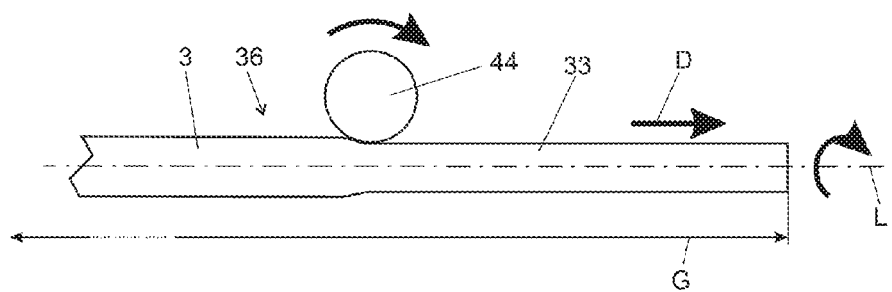
FIG. 4 is a schematic view of an example shaft semi-finished segment product in continuous grinding.

In order for the production to be designed so as to be more economical, the method according to invention which is schematically illustrated in FIG. 4 is proposed. An unmachined shaft material piece 3 which has a piece length G, for example one unmachined shaft material piece, is provided herein and is aligned on the longitudinal axis L. Said unmachined shaft material piece 3 is moved longitudinally in the processing direction D so as to be parallel with the longitudinal axis L, as is indicated by the arrow in FIG. 4. Said unmachined shaft material piece 3 herein is guided through a continuous grinding installation 44 while said unmachined shaft material piece 3 is rotated about the longitudinal axis L, as is indicated by the curved arrow. On account thereof, the unmachined material piece 3 across the entire piece length G thereof is continuously ground so as to be round in a dimensionally accurate manner by means of continuous grinding, said unmachined material piece 3 exiting the continuous grinding installation 44 in the processing direction D as a semi-finished segment product 33 ground in a dimensionally accurate manner.

The semi-finished segment product 33 ground in a dimensionally accurate manner has the same piece length G as the original unmachined material piece 3 that has been fed to continuous grinding. By means of a separation installation 43, such as has been illustrated in FIG. 9 for a hardened semi-finished segment product 31, segments 34 ground so as to be round in a dimensionally accurate manner can be cut to length in a simple manner from said ground semi-finished product 33. On account of the piece length G of the semi-finished segment product 33 being a multiple of the segment length Is of a ground segment 34, a correspondingly large number of segments 34 can be generated economically. The segments 34 can be used as segment blanks which in further processing steps can be machined according to the intended use of said segments, for example as shaft segments, connection segments, or other functional segments.

As an alternative to an unmachined segment material piece 3, it is conceivable and possible for a hardened semi-finished segment product 31 to be machined by continuous groundings according to the continuous hardening illustrated in FIG. 4. As a result, a hardened semi-finished segment product 33 ground in a dimensionally accurate manner having the piece length G is generated, from which a plurality of segments 34 can be economically cut to length.

Figure 5:
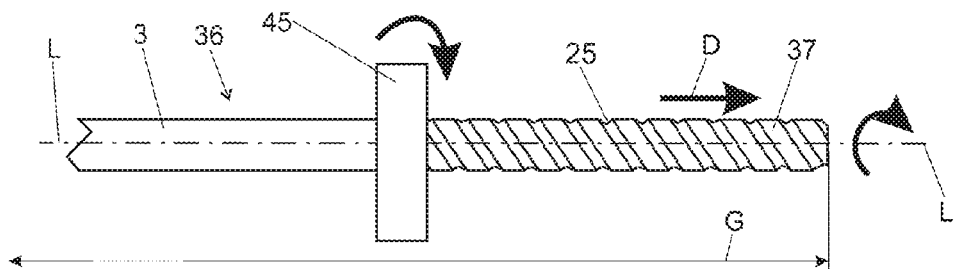
FIG. 5 is a schematic view of an example shaft semi-finished segment product when swirling for producing a threaded semi-finished product.
Figure 6:
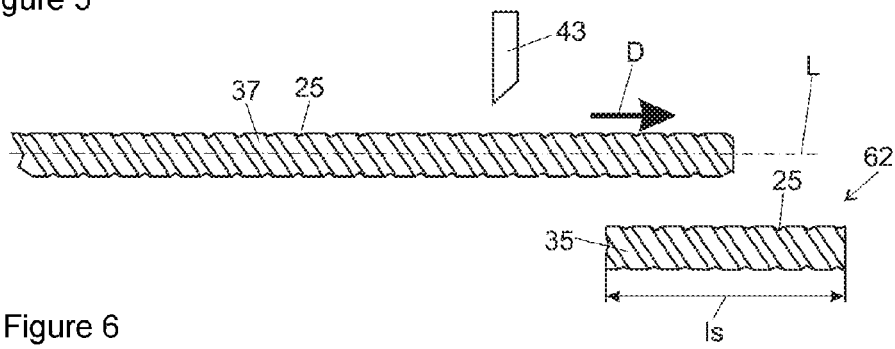
FIG. 6 is a cross-sectional schematic view of an example threaded segment being cut to length from a threaded semi-finished product according to FIG. 5.

It is schematically illustrated in FIG. 5 and FIG. 6 how a shaft segment that is configured as a threaded segment 35 may be produced economically by one example method of the present disclosure. To this end, an unmachined shaft material piece 36 which, as has been described for the preceding embodiments, has a piece length G which corresponds to a multiple of the shaft portion length S is provided. When a shaft portion 24 is configured as a threaded portion having a thread 25 that continues across the length of said shaft portion 24, the thread length in the axial direction A corresponds to the shaft portion length S.

A whirling installation 45 into which an unmachined segment material piece 3 having the piece length G is inserted in the processing direction D is illustrated in FIG. 5. A thread 25 which in the axial direction A extends continuously across the entire piece length G is progressively cut into the unmachined segment material piece 3 by means of a rapidly rotating whirling head, said unmachined segment material piece 3 moving in the processing direction D and herein rotating slowly in the whirling installation. A semi-finished threaded product 37 which has the same piece length G as the unmachined segment material piece 3 is generated by this thread whirling in the continuous method, also referred to as continuous whirling for short.

Threaded segments 35 which have in each case a segment length Is can in each case be cut to length from the semi-finished threaded product 37 by means of a separation installation 43. On account of the piece length G of the semi-finished threaded product 37 being a multiple of the segment length Is of the threaded segments 35, a correspondingly large number of threaded segments 35 can be generated economically. The threaded segments 35 can be connected to further segments, for example to a tooth segment, or be utilized as segment blanks which in further processing steps are machined according to the intended use of said segment blanks.

Figure 7:
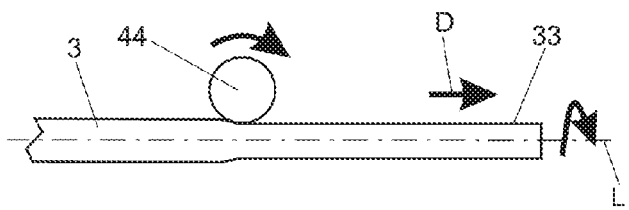
FIG. 7 is a schematic view of an example toothed portion semi-finished product in continuous grinding.
Figure 8:
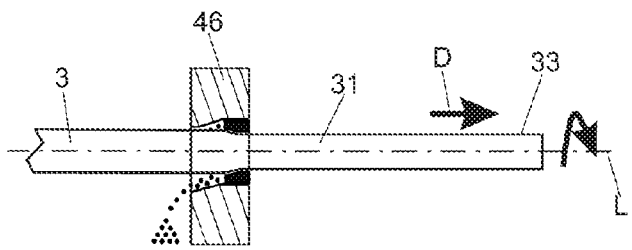
FIG. 8 is a schematic view of an example toothed portion semi-finished product in continuous peeling.

FIG. 7 shows how an unmachined segment material piece 3, for example for producing a toothed portion 21, can be ground to a round size across the entire piece length G of said unmachined segment material piece 3 in a continuous grinding procedure by means of a continuous grinding installation 44. Alternatively, it is possible for the unmachined segment material piece 3 to be likewise continuously machined to size across the entire piece length G of said unmachined segment material piece 3 by means of a peeling installation 46, as is illustrated in FIG. 8, so as to generate a dimensionally accurate semi-finished segment product 33. By contrast to the illustration of the unmachined shaft material pieces 3, unmachined toothed material pieces 32 are not hardened so as not to complicate any subsequent forming. Accordingly, the unmachined toothed material piece 32 is severed to the required length Is, preferably by means of sawing, directly after the machining by means of grinding (FIG. 7) or peeling (FIG. 8).

FIGS. 10 to 13 schematically show snapshots of a die 5 in successive steps of the method according to the invention. The view, that is to say the viewing direction, herein is transverse to the longitudinal axis L (the latter lying parallel with the longitudinal direction A) in the width direction B, perpendicular to the height direction H. The width direction B is defined by the direction which is aligned so as to be orthogonal to the end sectional plane SE of the toothing 22. The width direction B in the case of a spur toothing is defined by the direction in which the toothing 22 by way of the toothing width b extends transversely to the longitudinal axis L. The height direction H is defined by the radial direction which, in a manner perpendicular to the longitudinal axis L and perpendicular to the width direction B, runs perpendicularly from the back 23 through the toothing 22 of a rack 2.

The die 5 comprises a toothed die part 51 having a tooth mold clearance 52 which is formed as a negative impression of the toothing 22, and a rear die part 53 having a back mold clearance 54. The die 5 is separated in a separation plane T which in the width direction B runs parallel with the longitudinal axis L. The back mold clearance 54 is configured as the negative mold of the back 23 and as illustrated is shaped so as to be substantially semi-cylindrical, having a back radius R as can be clearly seen in the cross-sectional illustration of FIG. 6. It is likewise conceivable and possible for the back to have a Gothic cross-sectional profile, having two convexly curved portions which are at a mutual angle. Upper holding installations 55 (at the bottom in the illustration) are disposed in the longitudinal direction A, that is to say parallel with the longitudinal axis L, so as to neighbor the toothed die part 51 on both sides, and lower holding installations 56 (at the top in the illustration) are disposed so as to neighbor the back die part 53. A terminal detent 57 is disposed beside the holding installations 55, 56 on a side that in the longitudinal direction faces away from the die parts 52, 53.

In order for the method according to the invention to be carried out, a cylindrical unmachined segment material piece 3, hereunder also referred to as the blank 3 for short, having the segment length lz, is provided, heated to the forging temperature of 750° C. to 250° C., depending on the method, and inserted into the toothed mold clearance 52 and the back mold clearance 53 which in the open position are spaced apart from one another. A defined radial fixing of the longitudinal axis L of the blank 3 relative to the die 5 is performed by clamping between the holding installations 55 and 56. The blank 3, by way of the free end 26, in the longitudinal direction A is brought to stop on the terminal detent 57, on account of which the blank 3 is axially positioned, that is to say positioned in the direction of the longitudinal axis L.

Figure 10:
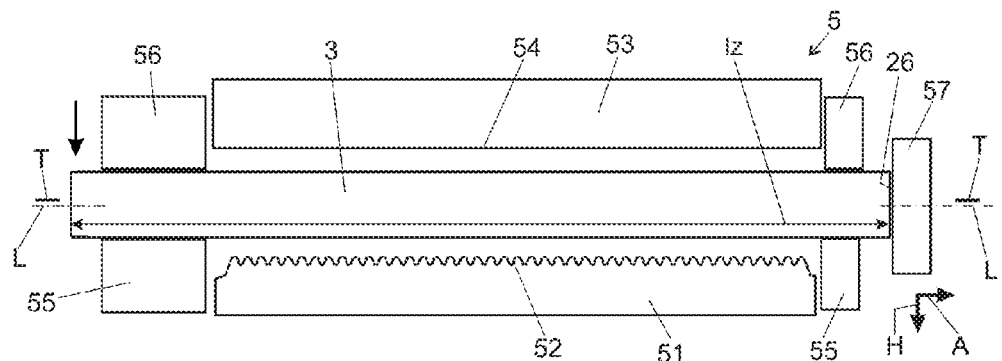
FIG. 10 is a schematic view transverse to a longitudinal axis of an example die in an open state, prior to forming.
Figure 11:
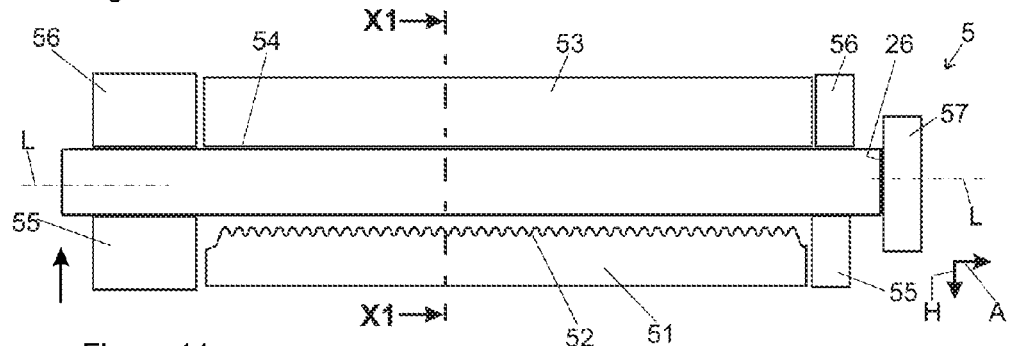
FIG. 11 is a schematic view of the die as in FIG. 10 in a subsequent method step, in a partially closed state.

The back die part 53 is moved from the open state according to FIG. 10 counter to the height direction H, as is indicated by the arrow in FIG. 10, until the back mold clearance 54 bears (from above in the drawings) on the rear side on the blank 3, as is illustrated in FIGS. 11 and 16. It can be derived from the sectional illustration of FIG. 16 that the cylindrical blank 3 has a blank radius r which, as required according to the invention, is smaller than the radius of the rear mold clearance 54, the back radius R. Accordingly, the back mold clearance 54 initially bears only in a linear manner on the external circumference in the back region of the blank 3. The back die part 53 is now located in the forging position.

Figure 12:
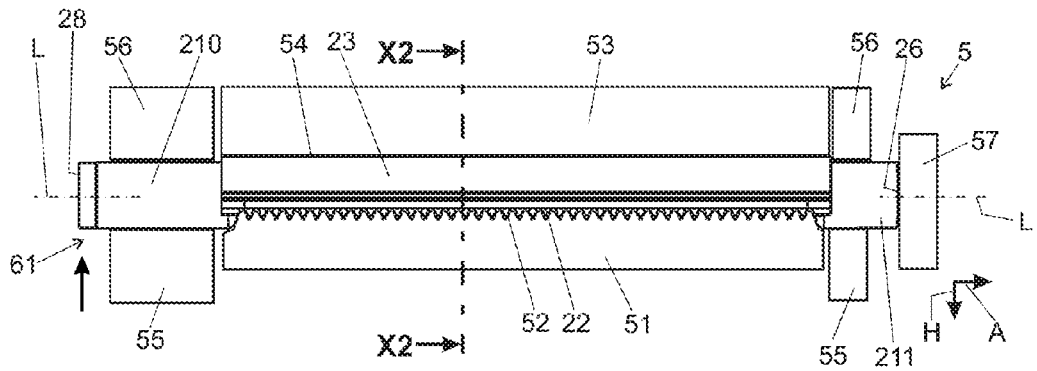
FIG. 12 is a schematic view of the die as in FIG. 11 in a subsequent method step, in a closed state.

The forging stroke is carried out in the next step, wherein the toothed die part 51 is moved in the height direction H (upward in the drawing), perpendicularly to the longitudinal axis L, toward the tooth-side of the blank 3, as is indicated by the arrow in FIGS. 11 and 12. The forming of the blank 3 is performed herein in that the material, preferably steel at the forging temperature, is plastically deformed, wherein the material flows and fills the cavity between the back die part 53 and the toothed die part 51. On account thereof, the back mold clearance 54 is impressed in the rear side in the blank 3, such that the back 23 having the back radius R is configured, and on that side that is opposite in relation to the longitudinal axis L the toothing 22 is impressed on the toothed side by the toothed mold clearance 51, such that the toothed portion 21 is configured. The blank 3 has in this way been formed to a toothed segment 61 which has a toothed portion 21 having the toothing 22 the back 23, as well as transition portions 210 and 211 that adjoin the toothed portion 21. The toothing 22 comprises a tooth root plane ZFE. The transition portions 210 and 211 have not been deformed in the forging and thus retain the same blank radius r and the longitudinal axis L as the blank 3. The joining face 28 where a shaft segment, for example in the form of a threaded segment 35, can be joined is located at the end side at the free end of the transition portion 210.

The terminal position of the forging stroke is shown in the cross section in FIG. 17 in the cross section X2-X2 through the toothed portion 21. It can be seen herein that the compression in the height direction H, perpendicular to the longitudinal axis L, when forging is so large that material in the toothed portion 21 between the toothed die part 51 and the back die part 53 in the separation T is squeezed out laterally in the width direction B, while forming burrs 29 protruding from the width B having a burr width GB in relation to the longitudinal axis L. The burrs 29 are spaced apart from the tooth root plane ZFE at a burr spacing Z in the height direction H. The burr spacing Z is the smallest spacing, measured in the height direction H, between the tooth root plane ZFE and the peripheral region of the respective burr 29. The peripheral region of the respective burr 29 is formed by the freely formed region. In order for the toothing 22 to be particularly positively configured when forming, the burr spacing Z preferably has a value which is smaller than 20% of the back radius R. The burr spacing Z particularly preferably has a value which is smaller than 15% of the back radius R. The burr spacing Z most preferably has a value which is smaller than 5% of the back radius R. On account of the freely formed burrs being configured close to the tooth root plane ZFE, an improved flow behavior in forming and an improved configuration of the structure of the toothing 22 can be achieved.

The back radius R in the toothed portion 21 defines a back axis Q around which the back 23 by way of the semi-cylindrical or partially cylindrical, respectively, shape thereof extends in a coaxial manner. On account of the compression caused in forming and the flowing in the width direction B associated with the former, the back when measured in the width direction B is imparted a back width (2×R) that corresponds to double the back radius R. The toothing 22 that is opposite the back 23 on account of forming is imparted a toothing width b in the width direction B. A utilizable toothing width b, also referred to as the tooth root width, which corresponds substantially to the back width (2×R) is preferably generated. An optimal radial support of the toothing 22 by the back 23 is performed and a high flexural resistance is implemented on account thereof.

Thanks to the method according to the invention, both the back width (2×R) as well as the toothing width b can be larger than the unmachined diameter (2×r) of the blank 3, said unmachined diameter (2×r) corresponding to double the unmachined radius. The introduction of force from the steering pinion 104 into the toothing 22 is improved on account thereof. Moreover, an optimized mounting of the back 23 in the steering gear 105 can be implemented, said back 23 being widened relative to the blank 3.

Figure 13:
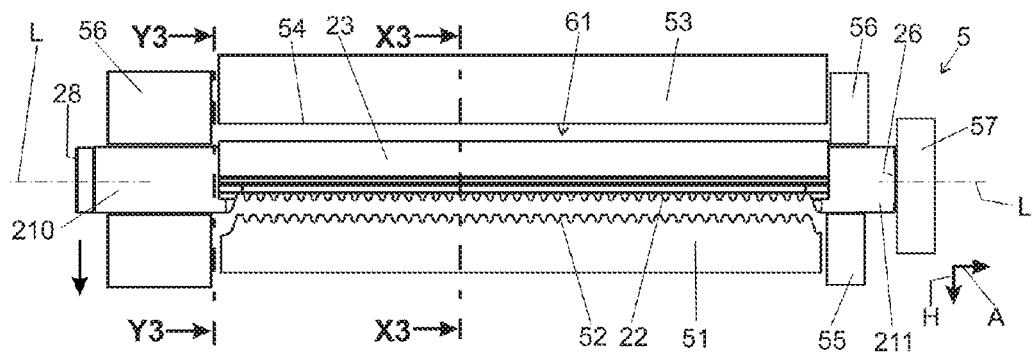
FIG. 13 is a schematic view of the die as in FIG. 12 in a subsequent method step, in a reopened state, after forming.

After the forging stroke, the back die part 53 and the toothed die part 51 are again diverged in a reverse stroke movement that is opposite to the forging stroke, as is illustrated in FIG. 13 and indicated by the arrows. The die 5 is again opened on account thereof, as is shown in FIG. 10. The finished toothed segment 61 can be removed from the die 5 in this position, and a new blank 3 can be inserted, as is illustrated in FIG. 10.

The finished toothed segment 61 in FIG. 14 is shown in a lateral view in the width direction B that is transverse to the longitudinal axis L, thus parallel with the toothing 22 in the direction of the toothing width b, and in FIG. 15 is shown in a plan view on the toothing 21 that is transverse to the longitudinal axis L, thus counter to the height direction H.

It can be derived from the cross section is shown in FIGS. 16 to 19, in particular from FIG. 19, that the longitudinal axis L which forms the axis of the blank 3 and, after forming, correspondingly forms the axis of the transition portion 210, is congruent with the back axis Q which by way of the back radius R is surrounded in a coaxial manner by the back 23. This coaxial arrangement can be clearly seen in FIG. 19 in that the unmachined radius r and the back radius R relate to the same axis L and Q, respectively.

Figure 20:
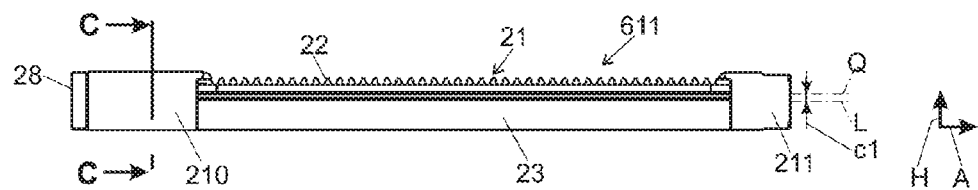
FIG. 20 is a schematic view of another example toothed segment analogous to that of FIG. 19, in a direction of a width of a toothing, the view being transverse to a longitudinal direction.
Figure 21:
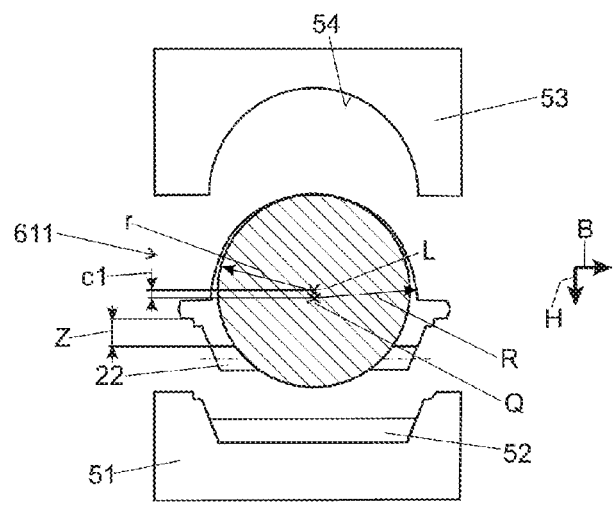
FIG. 21 is a cross-sectional view across line C—C through the example die according to FIG. 20.

A second embodiment of a toothed segment 611 according to the invention is illustrated in FIG. 20 in a lateral view corresponding to that of FIG. 14, and is illustrated in a section C-C through the transition portion 210 in a manner analogous to that of FIG. 19. As opposed to the toothed segment 61, the back axis Q herein in relation to the longitudinal axis L in a parallel manner is offset radially in the direction toward the toothing 21, specifically by a spacing c1 which is referred to as an offset. The offset c1 in the example shown corresponds to the difference between the radii R-r, is thus larger than zero, and can be referred to as a positive offset. The back 23, when viewed in the cross section, in the radial direction terminates at the lowermost point by way of the circumference of the transition portion 210. Accordingly, the toothing 22 in the radial direction is closer to the external circumference of the transition portion 210 by the difference (R-r), or in other words is molded less deeply into the cross section of the toothed segment 61 as is the case in the first embodiment according to FIG. 14.

Figure 22:
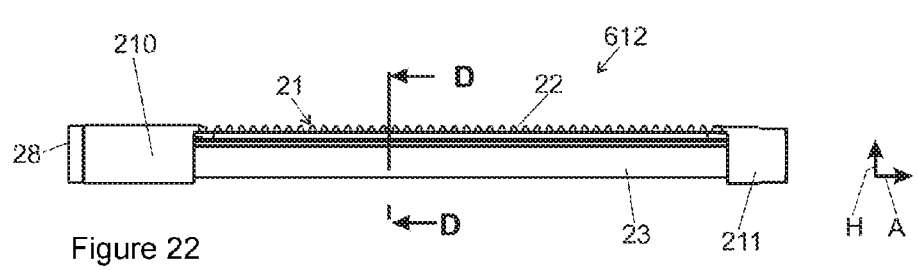
FIG. 22 is a side view of still another example toothed segment analogous to that of FIG. 19, in a direction of a width of a toothing, the view being transverse to a longitudinal direction.
Figure 23:
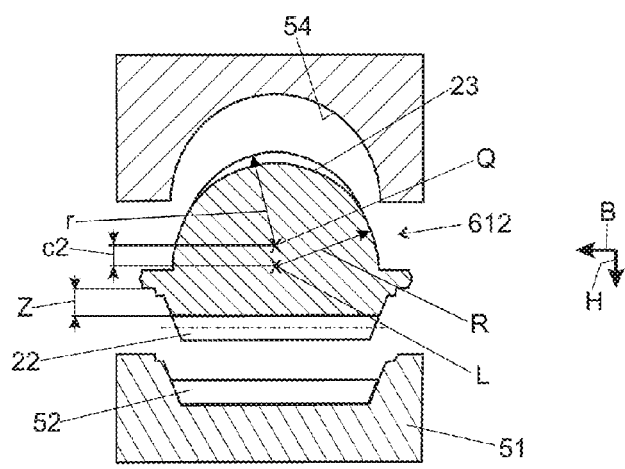
FIG. 23 is a cross-sectional view across line D—D through the example die according to FIG. 22.

A third embodiment of a toothed segment 612 according to the invention is illustrated in FIG. 22 in a lateral view corresponding to that of FIG. 14, and in FIG. 23 is illustrated in the section D-D through the toothed portion 21 in a manner analogous to that of FIG. 18. As is the case in the last-described embodiment of the toothed segment 611, the back axis Q is again offset in relation to the longitudinal axis L, specifically by a spacing or offset c2, respectively. The offset c2 in this embodiment is larger than the radii difference (R-r) such that the transition portion 210 in the cross section projects beyond the back 23, as can be seen in the sectional illustration of FIG. 23. The offset c2 in the example shown is chosen such that the toothing 22 in the height direction H terminates so as to be flush with the circumference of the transition portion 210. The toothing 22 in relation to the longitudinal axis L lies higher than in the case of the second embodiment of the toothed segment 611.

Thanks to the method according to the invention, an offset c1 or c2 can be implemented in a simple manner by a corresponding design of the die 5, if required. This can be achieved in detail in that the radial offset between the holding installations 55 and 56, which fix the position of the longitudinal axis L, and the toothed die part 51 and the back die part 53, which by way of the shaping of the back 23 determine the position of the back axis Q, is set according to the radii difference (R-r). In this way, the depth of the toothing 22 can be implemented so as to correspond to the respective requirements in the steering gear 105 by way of a die 5 that is of a relatively simple construction.

A further advantage of the method according to the invention also lies in that a rack can be implemented in particular also by way of less material input, because the radii difference does not cause any waste. The material input can be reduced on account thereof, even when the blank is formed from a solid material.

A rack for the steering gear of the motor vehicle is preferably implemented in this method, said rack having a toothed portion 21 which extends along the longitudinal axis L and, in relation to the longitudinal axis L, opposite the toothed portion 21 has a cylinder-segment-shaped back 23 having a back radius R, wherein a further cylindrical transition portion 201, 211 is configured on the toothed portion 21, the radius r of said further cylindrical transition portion 201, 211 being smaller than the back radius R. A radii difference in the range from 3% to 7% in relation to the back radius R is preferable. A radii difference particularly preferably lies in the range from 4.5% to 6.5%. Good shapings in the case of simultaneously advantageous material savings can be implemented herewith.

The method according to the invention offers yet a further significant advantage. A multiplicity of parameters must be adhered to in order for a rack which has a toothed portion illustrated in the example to be inserted into a steering gear. For example, the specified diameter of the rack is to be as small as possible in order for installation space to be saved. The burr width GB which is configured on both sides of the toothing width is in particular to remain limited. It is desirable here in that the mechanical post-processing is to be limited. In particular, the two burrs 29 by way of the method proposed can be implemented so as to have a respective burr width GB of less than 25% of the toothing width b, without any mechanical post-processing having to be performed. A respective burr width of less than 18% of the toothing width is preferable. Respective burr widths GB of less than 10%, or particularly preferably of at most 5%, of the toothing width b, can be achieved by optimizing the parameters in the tool. It is thus not necessary for the burrs 29 which in forming are created on both sides of the toothing to be removed, on account of which the mechanical post-processing of the toothed portion 21 can be reduced.

Figure 24:
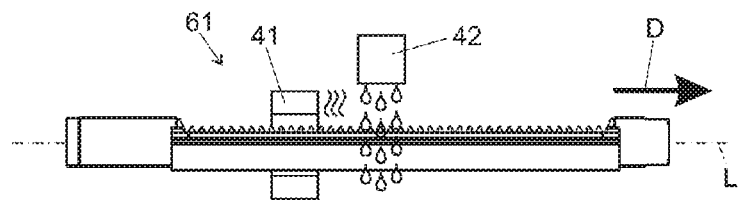
FIG. 24 is a schematic view of an example toothed segment in continuous hardening.

After forging, a toothed segment 61 (or 611 or 612, respectively) can be hardened in the continuous method, as is shown in FIG. 24. The toothed segment 61 herein is moved parallel with the longitudinal axis L through a continuous heating installation 41 and through a continuous cooling installation 42 that in the processing direction D is downstream of said continuous heating installation 41. The steel can be hardened by the corresponding choice of the thermal and temporal parameters, as has already been described in principle above in conjunction with FIG. 3 for a semi-finished shaft segment product 31. The optimal hardness for the stresses to be expected in operation can be set on account thereof.

Figures 29, 30, 31, 32, 33, 34, 35:
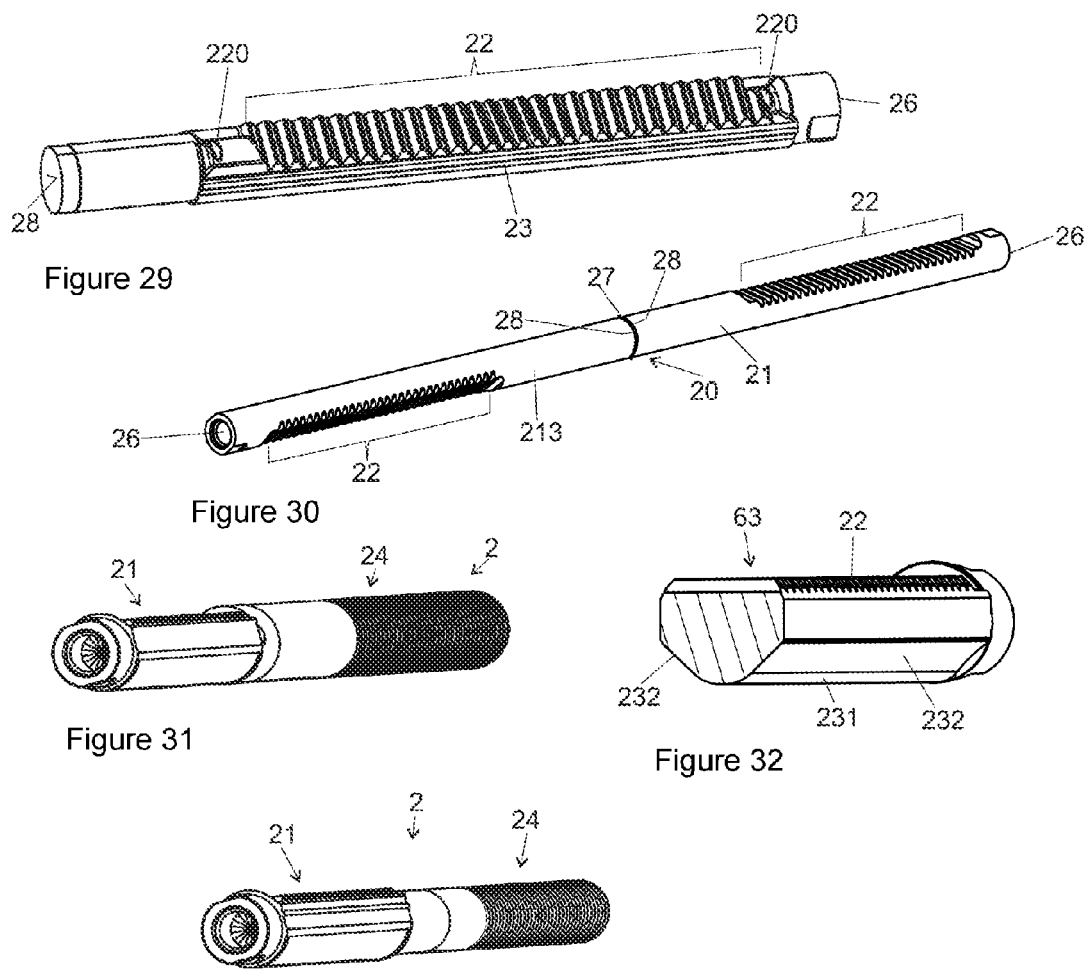
FIG. 29 is a perspective view of an example toothed segment.
FIG. 30 is a perspective view of still another example constructed rack.
FIG. 31 is a perspective view of another example rack having a V-back.
FIG. 32 is a perspective sectional view of the example rack according to FIG. 31.
FIG. 33 is a perspective view of yet another example rack having a V-profile.
FIG. 34 is a cross-sectional view through an example die having an inserted semi-finished product prior to forging, in a manner analogous to FIG. 16.
FIG. 35 is a cross-sectional view through the example die according to FIG. 34 after forging.

FIG. 32 shows a toothed segment 63 which has a V-shaped back 231, referred to as the V-back 231 for short. The V-shape is by two V-leg faces 232, which when seen from the toothing 22 converge at an angle toward the back 231.

The V-back 231 in the cross section is enclosed by an envelope circle having the back radius R1, as can be derived from the sectional illustration of FIG. 35. The V-leg faces 232 comprise secants of the envelope circle which in FIG. 35 is drawn using dashed lines.

A transition portion 210 adjoins the toothing 22, as is the case in the D-shaped embodiment described above in conjunction with FIG. 10 to FIG. 24. The transition portion 210 has a radius r1 which corresponds to the unmachined radius r1 of the blank 3 according to FIG. 34.

The forging can be performed in a die 50 according to the method according to the invention, as is illustrated in the section in FIG. 34 in a manner analogous to that of FIG. 16, and is illustrated in FIG. 35 in a manner analogous to that of FIG. 18 or FIG. 23. The toothed die part 51 of the die 50 constructed as in the D-shaped embodiments of the die 5 described above. Deviating therefrom, the back die part 531 has a back mold clearance 541 that is V-shaped in the cross section.

It can be derived from FIG. 34 how a blank 3 having the unmachined radius r1 is inserted between the back die part 531 and the toothed die part 51. The envelope circle of the back mold clearance 541 having the back radius R1 is plotted using dashed lines. It can be seen that the blank 3 in the non-formed unmachined state, having the unmachined radius r1 is smaller as compared to the back radius R1, does not fill the die 5 in the width direction B, and that the blank 3 does not lie in a coaxial manner in the envelope circle.

FIG. 35 shows the finished toothed segment 63 forged from the blank 3. In this exemplary embodiment, the back 231, by way of the envelope circle thereof, and the transition portion 210 lie so as to be coaxial with the longitudinal axis L, that is to say that the radii r1 and R1 relate to the longitudinal axis L, as is the case in a D-shaped back 23 in the exemplary embodiment according to FIGS. 10 to 19. However, it is also conceivable and possible for an offset for a V-back 231 to be defined according to the requirements of the steering gear, as is the case in the embodiment according to FIGS. 20, 21, or FIGS. 22, 23.

FIGS. 31 and 32 show embodiments of racks 2 having different diameter conditions in the toothed portion 21 and the shaft portion 24, wherein the shaft portion 24 according to FIG. 31 has a larger diameter.

An advantage of the forging method according to the invention for producing a toothed segment 61, 611, 612, or 63 is that lower forging forces are required for forming a blank 3 having an unmachined radius r (or r1, respectively) that is smaller as compared to the back radius R (or R1, respectively), than in the case of the unmachined radius corresponding to the back radius, as in the prior art.

The same advantages in terms of the burr width and the conditions of the ratio of the back radius R1 to the unmachined radius r1 are derived in manner analogous to that as already discussed above in the context of the D-shaped back.

A rack for a steering gear of a motor vehicle is preferably implemented in this method, said rack having a toothed portion 21 which extends along the longitudinal axis L and, in relation to the longitudinal axis L, opposite the toothed portion 21 has a cylinder-segment-shaped back 23 having a back radius R1, wherein a further cylindrical transition portion 201, 211 is configured on the toothed portion 21, the radius r1 of said further cylindrical transition portion 201, 211 being smaller than the back radius R1. A radii difference preferably lies in the range from 3% to 7% in terms of the back radius R1. A radii difference in the range from 4.5% to 6.5% is particularly preferable.

The respective burr width GB having less than 25% of the toothing width b can also be implemented in this embodiment having the V-back, without any mechanical post-processing having to be performed. Accordingly, it is preferable also here for a respective burr width of less than 20% of the toothing width, or more preferably of less than 15%, or particularly preferably of at most 10%, of the toothing width b to be achieved.

Figure 25:
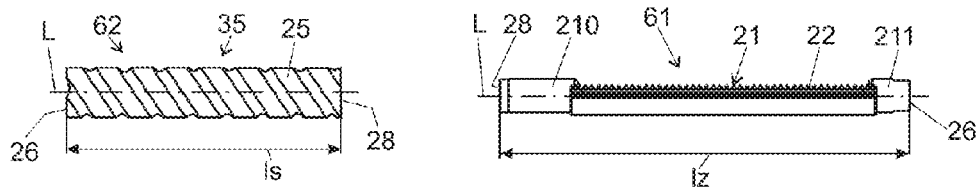
FIG. 25 is a schematic view of an example threaded segment and an example toothed segment prior to being clamped in a clamping device.
Figure 26:
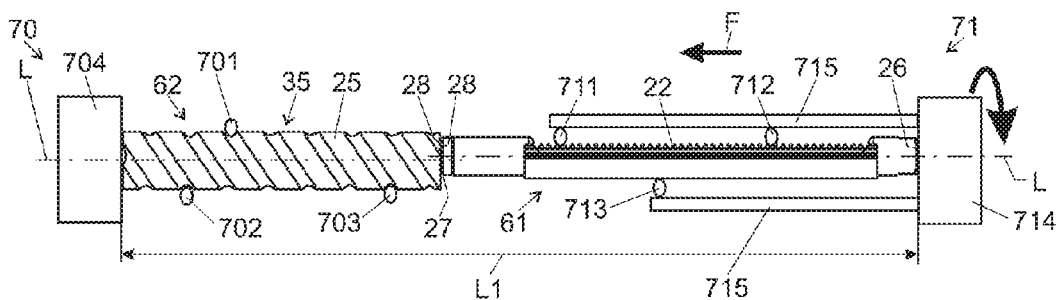
FIG. 26 is a schematic view of an example threaded segment and an example toothed segment in a clamping device prior to friction welding.
Figure 27:
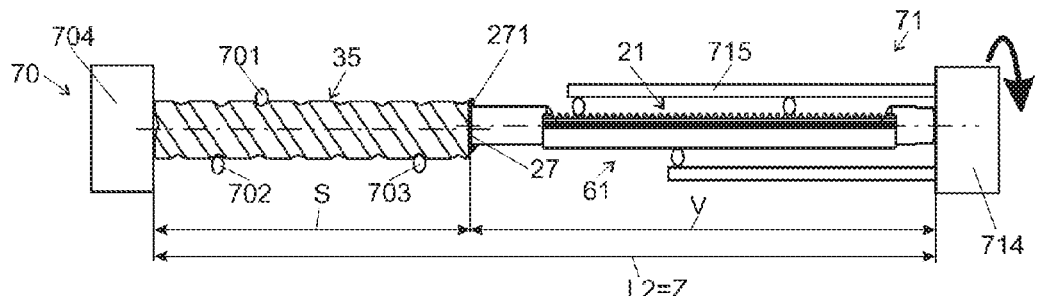
FIG. 27 is a schematic view of an example threaded segment and an example toothed segment in a clamping device after friction welding.

A method according to the invention for producing a rack 2 in which shaft segments, here a threaded segment 35, are joined to a toothed segment 61 by means of friction welding is illustrated in FIGS. 25 to 27.

The threaded segment 35 can be made as has been described above in conjunction with FIG. 5 and FIG. 6, for example. The threaded segment 35 in the direction of the longitudinal axis L has a segment length ls, and at one end side has a joining face 28.

The toothed segment 61 can be made available, for example, by means of a method as has been described above by means of FIGS. 10 to 23, or FIGS. 36 to 40. The toothed segment 61 has a segment length lz, and at one end side likewise has a joining face 28.

The threaded segment 35 is clamped in a clamping installation 70 and is aligned in a coaxial manner on the longitudinal axis L, as is illustrated in FIG. 26. The clamping installation 70 has clamping elements 701, 702, and 703, and a counter bearing 74. The clamping elements 701, 702, and 703 from the outside bear between the thread terms of the thread 25 in such a manner that a defined alignment is guaranteed on the longitudinal axis L. The thread 25 herein forms a reference face. The threaded segment 35 by way of the free end 26 thereof in the axial direction is supported on the counter bearing 704, on account of which a precise axial positioning in the direction of the longitudinal axis L is achieved.

The toothed segment 61 is clamped in a clamping installation 71 and is aligned in a coaxial manner on the longitudinal axis L. The clamping installation 71 has clamping elements 711, 712, and 713. The clamping elements 711 and 712 bear on the toothing 22; the clamping element 713 bears on the back 23. On account thereof, the functional faces of the toothing 22, or of the back 23, respectively, form reference faces which are precisely aligned on the longitudinal axis L.

The toothed segment 61 by way of the joining face 28 thereof bears on the joining face 28 of the threaded segment 35. The toothed segment 61 by way of the free end 26 thereof is supported in the axial direction on a compression piece 714 which by way of connection elements 715 is rigidly connected to the clamping elements 711, 712, and 713 of the clamping installation 71, and so as to be connected in a rotationally fixed manner relative to the longitudinal axis L.

The clamping installation 71 by a drive installation (not illustrated) is drivable so as to rotate about the longitudinal axis L, as is indicated by the curved arrow. A contact pressure force F in the direction of the longitudinal axis L can be exerted on the clamping installation 71 by means of a contact pressure installation (likewise not illustrated), as is indicated by the force arrow, and the joining face 28 of a clamped toothed segment 61 by way of said contact pressure force F being able to be pressed in an axial manner in the direction of the longitudinal axis L against the joining face 28 of the threaded segment 35 that is clamped in the clamping device 70. The joining faces 28 on account thereof are in frictional contact with one another.

The clamping installation 71 after clamping is positioned relative to the clamping installation 70 such that the threaded segment 35 and the toothed segment 61 by way of the joining faces 28 thereof bear on one another, the threaded segment 35 bears axially on the counter bearing 704, and the toothed segment 61 bears on the compression piece 714. Consequently, the overall spacing, the so-called start spacing L1, between the compression piece 714 and the counter bearing 704 is equal to the sum of the segment lengths ls and lz, thus: L1=ls+lz (length ls of the threaded segment 35+length lz of the toothed segment 61).

The clamping installation 71 is set in rotation for friction welding according to the invention, such that the joining faces 28 rotate relative to one another under friction. The friction heat being released herein depends on the rotating speed and the contact pressure force F.

The contact pressure force F at the level of an initial friction force F1 is first exerted in order for initial friction to be performed, said initial friction force potentially being between 10 kN and 30 kN, for example. A homogenization of the surfaces of the joining faces 28 is performed on account thereof. Initial friction can be performed for a duration of less than 3 seconds.

The contact pressure force F is subsequently increased to an input force F2 in order for thermal input friction to be performed, said input force F2 potentially being approximately 5 to 12 times, preferably 6 to 11 times, the initial friction force F1. Thermal input friction is performed until the desired process temperature for welding steel has been reached at the joining faces 28. A fixed duration can be predefined herein, or time is regulated by way of the measured temperature. Durations of less than 15 seconds are preferably adhered to herein.

Upon reaching the process temperature, the contact pressure force F is increased to 10 to 20 times, preferably 17 times, the initial friction force F1. A compression is performed on account of the material melting between the joining faces 28 at the joint 27, the toothed segment 61 and the threaded segment 35 in said compression while the forming moving toward one another at the joint 27 such that the start length L1 is shortened. Only a defined shortening until a predefined target length L2 has been reached is permitted according to the path-controlled method according to the invention. The shortening is the so-called joining path X which corresponds to the difference between the start length L1 and the target length L2: X=L1–L2.

The final state in which the overall length L2 is reached is illustrated in FIG. 27. The target length L2 corresponds to the rack length Z of a rack 2 such as is shown in FIG. 2 or in FIG. 41, for example, wherein the shaft portion 24 has a shaft portion length S that on account of welding is shortened in relation to the segment length Is, and the toothed portion 21 has a toothed portion length V which is shorter than the segment length lz.

Material has been squeezed out in a radial manner at the joint 27 when welding, said material forming an encircling welding bead 271.

Figure 28:
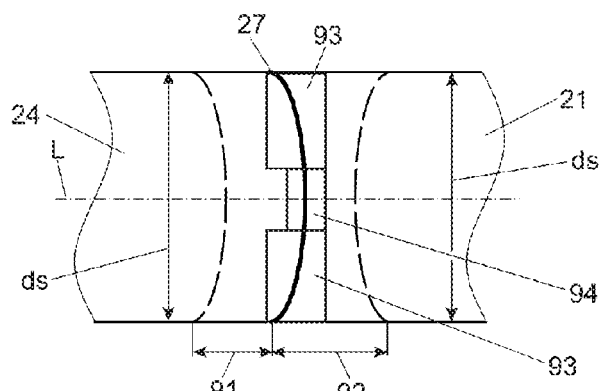
FIG. 28 is a schematic hardness profile of an example friction-welded connection.

A hardness profile which can be generated at the joint 27 by way of the friction welding according to the invention is schematically illustrated in FIG. 28. A thermal input that is relevant to modification of the structure of the steel is performed on account of the friction welding, said thermal input being in the direction of the longitudinal axis L into a heat influence zone 91 and 92 of the shaft portion 24, or of the toothed portion 21, respectively. The welding parameters such as rotating speed and contact pressure force F according to the invention are preferably defined such that the heat influence zones 91 and 92 are heated to at most 250° C. The heat influence zones 91 and 92 in the case of the method according to the invention preferably have a maximum width of 0.25×ds, wherein ds indicates the diameter of a segment 21 or 24, respectively.

The heating is most intense in the radially outward circumferential region in the direct proximity of the joint 27. A hardness increase in relation to the base material of at most 200 HV1 is permitted in this coaxially encircling peripheral region 93. A hardness increase of at most 250 HV1 is permitted for the core region 94 which is located centrally within the peripheral region 93. The forming of metallurgical notches is avoided and a higher load-bearing capability is achieved on account of the hardness increase being lower in the peripheral region 93 than in the core region 94.

A rack for a motor vehicle steering mechanism is advantageously implemented by the method management, said rack being formed from two segments, for example a toothed segment 61 or toothed segment 63 having a shaft segment 62, which are connected to one another by means of friction welding, wherein the maximum micro hardness in the longitudinal axis L, in a first spacing which measured from the center of the welding seam and which is larger than the segment diameter ds of the segment having the smaller diameter multiplied by 0.3, is greater by less than 200 HV1 as compared to the micro hardness in the longitudinal axis at a spacing of 1.5 times the segment diameter ds of the segment having the smaller diameter. The increase in the hardness is preferably less than 120 HV1.

It is particularly preferable herein for the maximum micro hardness in the surface in a spacing which is measured from the center of the welding seam and which is larger than the segment diameter ds of the segment having the smaller diameter multiplied by 0.3, is greater by less than 250 HV1 than the micro hardness in the surface at a spacing of 1.5 times the segment diameter ds of the respective segment. The increase in hardness is preferably less than 180 HV1.

FIG. 29 shows a toothed segment 61 in a perspective view. Said toothed segment 61 has positioning elements 220 which is disposed so as to be positionally and dimensionally accurate relative to the functional faces of the toothing 22, of the back 23, of the joining face 28 or the like. The positioning elements 220 can be conjointly shaped in a simple manner when forging the toothed segment 61. Furthermore, the positioning elements 220 can be configured as precise reference faces by suitable machining methods such as grinding, eroding, or the like, and in terms of the shape and the arrangement be optimized as clamping faces for clamping in a clamping device, for example of clamping elements that engage in the form-fitting manner such as the clamping elements 701, 702, 703, 711, 712, or 713 according to FIGS. 26 and 27.

FIG. 30 shows an embodiment of a constructed rack 20 which has a toothed portion 21 and a second toothed portion 213 that as a shaft portion is connected to said toothed portion 21. The toothed portion 21 and the toothed portion 213 are connected at the joint 27 by means of friction welding. Both the toothed portion 21 as well as the toothed portion 213 have a toothing, said toothing having been incorporated by mechanical processing, for example by milling. It is likewise conceivable and possible for a toothed portion having a milled toothing to be connected to a forged toothed portion by means of friction welding.

Figure 36:
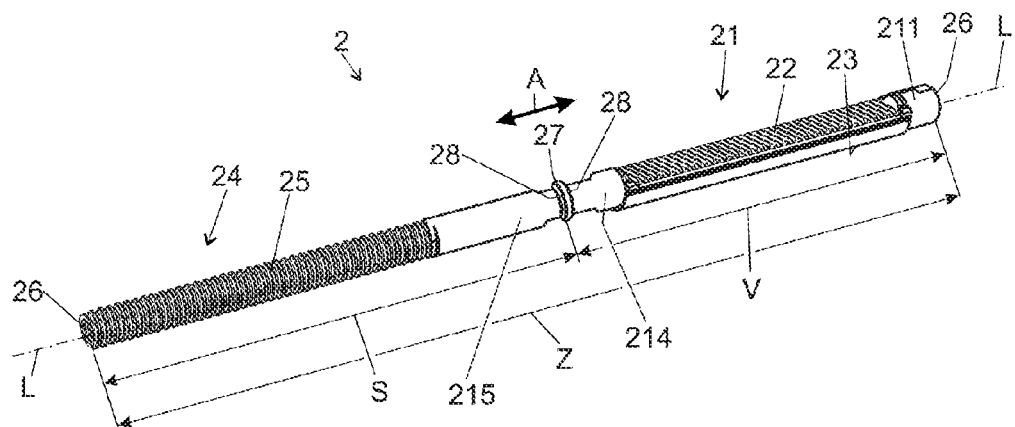
FIG. 36 is a perspective view of still another example rack.
Figure 37:
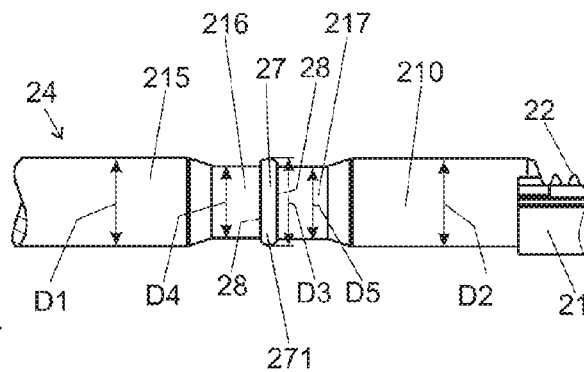
FIG. 37 is a schematic view of the example rack according to FIG. 36 in a direction of a width of a toothing, with the view being transverse to a longitudinal direction.

FIGS. 36 and 37 show a rack produced according to the invention in a further embodiment. The rack 2 has a toothed portion 21 which on one side is provided with a toothing 22 which extends in the longitudinal direction A. The rack 2 furthermore has a shaft portion 24 which in the example shown in FIG. 41 has a thread 25 and is also referred to as the threaded portion 24. The toothed portion 21 has a transition region 210 which at the free end of the transition portion 210 comprises a reduced diameter portion 217. The reduced diameter portion 214 has a smaller diameter D5 than the transition portion 210 having the diameter D2. The shaft portion 22 has a transition region 215 which at the free end of the transition portion 215 comprises a reduced diameter portion 216. The reduced diameter portion 216 has a smaller diameter D4 than the transition portion 216 having the diameter D1. The toothed portion 21 and the shaft portion 22, by way of the joining faces 28 thereof, at those ends of the reduced diameter portions 216, 217 thereof that face one another in the axial direction are connected to one another by friction welding in a joint 27. Material has been squeezed out in a radial manner at the joint 27 when welding, said material forming an encircling welding beads 271 having the envelope circle diameter D3. Said envelope circle diameter D3 of the welding bead 271 is smaller than the diameter D1 of the reduced diameter portion 216 and is smaller than the diameter D2 of the reduced diameter portion 214. The envelope circle diameter D3 is larger than the diameter D4 of the reduced diameter portion 216 and larger than the diameter D5 of the reduced diameter portion. Mechanical post-processing of the welding bead 217 is not required on account of the envelope circle diameter D3 being smaller than the diameter is D1, D2, since the welding bead 271 in a radially outward manner does not project further than the transition regions 210, 215.

Figure 38:
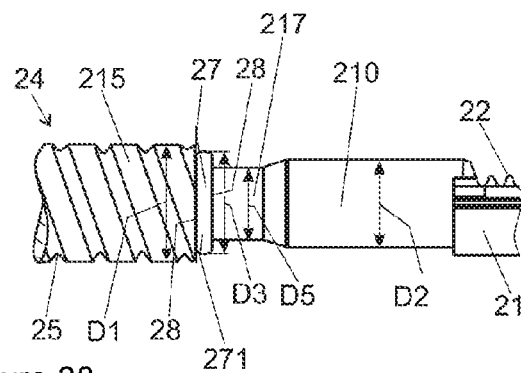
FIG. 38 is a schematic view of another example rack, similar to that of FIG. 37.

An alternative embodiment of a rack 2, similar to that of FIGS. 41 and 42, is illustrated in a detailed view in FIG. 38. The envelope circle diameter D3 is configured so as to be larger than the diameter D5 of the reduced diameter portion 217 and the diameter D2 of the transition portion 210. The envelope circle diameter D3 according to the invention is smaller than the diameter D1 of the transition region 215 of the shaft portion 24. The transition region 215 of the shaft portion 24 has the thread 25 which in this embodiment extends across the entire length of the shaft portion 24. The transition region thus represents the portion of the shaft portion that is adjacent to the joint 27. On account of the envelope circle diameter D3 of the welding bead 271 being smaller than the diameter D1 of the transition region 215, it can be achieved that the welding bead 271 does not project in an interfering radially outward manner and any additional subtractive machining of the welding bead 271 is not required since the welding bead 271 according to the invention in a radially outward manner does not project further than the transition region 215.

What is claimed is:

1. A method for producing a rack for a steering gear of a motor vehicle, the method comprising:
providing a shaft raw material piece having a piece length that is at least twice a shaft segment length;
continuously grinding at least part of a circumferential face of the shaft raw material piece across at least twice the shaft segment length to produce a semi-finished shaft segment product,
wherein continuously grinding comprises configuring a functional portion of the shaft segment with a predefined final dimension;
cutting to length a shaft segment from the semi-finished shaft segment product, the shaft segment being bar-shaped;
providing a toothed segment, the toothed segment being bar-shaped;
aligning the toothed and shaft segments on a longitudinal axis; and
joining the shaft segment to the toothed segment at a joint.

2. The method of claim 1 wherein the shaft raw material piece that is provided is at least one of hot formed, cold formed, or subtractively machined.

3. The method of claim 1 wherein the shaft raw material piece that is provided is a rod or a tube.

4. The method of claim 1 wherein the shaft raw material piece that is provided is a round material.

5. The method of claim 1 comprising thermally treating the shaft raw material piece prior to the continuous grinding.

6. The method of claim 1 wherein for configuring a joining face, the cutting to length provides an end-side end face of the shaft segment.

7. The method of claim 1 comprising welding the toothed segment and the shaft segment to one another.

8. The method of claim 1 wherein a functional portion of the shaft segment comprises at least one of a rack portion, a threaded portion, or a connection portion.

9. The method of claim 1 wherein the shaft segment comprises a first functional portion, wherein the method comprises joining a second functional portion to at least one of the toothed segment or the shaft segment.

10. A method for producing a rack for a steering gear of a motor vehicle, the method comprising:
providing a segment raw material piece having a piece length that is at least twice a segment length;
continuously grinding at least part of a circumferential face of the segment raw material piece across at least twice the segment length to produce a semi-finished segment product,
wherein continuously grinding comprises configuring a functional portion of the segment raw material piece with a predefined final dimension before joining the first and second segments;
cutting to length a first segment from the semi-finished segment product;
providing a second segment;
aligning the first and second segments on a longitudinal axis; and
joining the first and second segments at a joint.

11. The method of claim 10 comprising cutting a thread into the segment raw material piece before joining the first and second segments.

12. The method of claim 10 comprising thermally treating the segment raw material piece prior to the continuous grinding.

13. The method of claim 10 wherein joining the first and second segments comprises welding the first and second segments to one another.

14. The method of claim 10 wherein a functional portion of the first segment comprises at least one of a rack portion, a threaded portion, or a connection portion.

15. The method of claim 10 wherein the first segment comprises a first functional portion, wherein the method comprises joining a second functional portion to at least one of the second segment or the first segment.

16. A method for producing a rack for a steering gear of a motor vehicle, the method comprising:
continuously grinding a segment raw material piece across at least twice a shaft segment length to form a semi-finished segment product that includes a functional portion with a predefined final dimension;
cutting to the shaft segment length a first segment from the semi-finished segment product;
plastically deforming a surface of a second segment;
aligning the first and second segments along a longitudinal axis; and
joining the first and second segments after the continuous grinding, the cutting to length, and the plastic deformation.

17. The method of claim 16 wherein the functional portion is a bearing face configured to mount the rack in the steering gear.

18. The method of claim 16 wherein the joining of the first and second segments comprises friction welding, wherein the functional portion formed by the continuous grinding has a mean surface roughness of less than 6.3 µm that is ready for use in the steering gear without post-machining.

* * * * *